United States Patent
Suzuki et al.

(10) Patent No.: US 8,643,762 B2
(45) Date of Patent: Feb. 4, 2014

(54) OPTICAL DEVICE, SOLID-STATE IMAGE APPARATUS, PORTABLE INFORMATION TERMINAL, AND DISPLAY APPARATUS

(75) Inventors: Kazuhiro Suzuki, Tokyo (JP); Risako Ueno, Tokyo (JP); Hideyuki Funaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 13/221,195

(22) Filed: Aug. 30, 2011

(65) Prior Publication Data

US 2012/0218454 A1 Aug. 30, 2012

(30) Foreign Application Priority Data

Feb. 25, 2011 (JP) ................. 2011-040163

(51) Int. Cl.
*H04N 5/225* (2006.01)
*G02B 17/00* (2006.01)

(52) U.S. Cl.
USPC ............ 348/335; 348/340; 359/365; 359/366

(58) Field of Classification Search
None
See application file for complete search history.

(56) References Cited

U.S. PATENT DOCUMENTS

| | | | |
|---|---|---|---|
| 2006/0228826 A1* | 10/2006 | Kim et al. | 438/60 |
| 2008/0165270 A1* | 7/2008 | Watanabe et al. | 348/340 |
| 2008/0303107 A1* | 12/2008 | Minamio et al. | 257/432 |
| 2008/0309813 A1* | 12/2008 | Watanabe | 348/340 |
| 2009/0237517 A1* | 9/2009 | Lam et al. | 348/208.11 |
| 2010/0066812 A1* | 3/2010 | Kajihara et al. | 348/46 |
| 2010/0284089 A1* | 11/2010 | Shyu et al. | 359/622 |
| 2011/0127684 A1* | 6/2011 | Lee et al. | 264/1.1 |
| 2012/0068291 A1* | 3/2012 | Kawasaki et al. | 257/432 |
| 2012/0081801 A1* | 4/2012 | Duparre et al. | 359/811 |
| 2012/0281072 A1* | 11/2012 | Georgiev et al. | 348/49 |

FOREIGN PATENT DOCUMENTS

| | | |
|---|---|---|
| JP | 2003-5313 A | 1/2003 |
| JP | 2004-85924 A | 3/2004 |
| JP | 2008-167395 | 7/2008 |
| JP | 2008-233251 A | 10/2008 |
| JP | 2010-210968 A | 9/2010 |
| WO | WO 2008/114813 A1 | 9/2008 |

OTHER PUBLICATIONS

U.S. Appl. No. 13/361,293, filed Jan. 30, 2012, Kobayashi, et al.
U.S. Appl. No. 13/361,321, filed Jan. 30, 2012, Ueno, et al.

(Continued)

*Primary Examiner* — Lin Ye
*Assistant Examiner* — John H Morehead, III
(74) *Attorney, Agent, or Firm* — Oblon, Spivak, McClelland, Maier & Neustadt, L.L.P.

(57) ABSTRACT

An optical element according to an embodiment includes: a lens array including a plurality of convex shaped lenses provided on a first surface thereof and taking a flat shape at a second surface which is opposite from the first surface; a lens holder comprising concave portions formed to correspond to respective lenses in the lens array, at a surface opposed to the lens array, each of the concave portions having a size which makes it possible for one of the convex shaped lenses corresponding to the concave portion to fit therein; and a drive unit configured to drive at least one of the lens array and the lens holder to bring the convex shaped lenses in the lens array and the concave portions in the lens holder into an isolation state or a contact state.

13 Claims, 9 Drawing Sheets

(56) References Cited

OTHER PUBLICATIONS

U.S. Appl. No. 13/350,595, filed Jun. 22, 2012, Ogasahara, et al.
U.S. Appl. No. 13/221,061, filed Aug. 30, 2011, Ueno et al.
Office Action issued Feb. 5, 2013 in Japanese Patent Application No. 2011-040163 (with English-language translation).
U.S. Appl. No. 13/713,304, filed Dec. 13, 2012, Ueno et al.
U.S. Appl. No. 13/714,960, filed Dec. 14, 2012, Kobayashi, et al.

* cited by examiner

OPTICAL DEVICE, SOLID-STATE IMAGE APPARATUS, PORTABLE INFORMATION TERMINAL, AND DISPLAY APPARATUS

CROSS-REFERENCE TO RELATED APPLICATION

This application is based upon and claims the benefit of priority from prior Japanese Patent Application No. 2011-40163 filed on Feb. 25, 2011 in Japan, the entire contents of which are incorporated herein by reference.

FIELD

Embodiments described herein relate generally to an optical device, a solid-state image apparatus, a portable information terminal, and a display apparatus.

BACKGROUND

As for an imaging technique capable of obtaining a distance in the depth direction as two-dimensional array information, various methods such as a method using a reference beam and a stereo distance measuring method using a plurality of cameras are being studied. Especially, in recent years, needs for comparatively inexpensive products as a new input device for consumer use have increased. In imaging apparatuses utilizing the light field photography technique, changeover between an ordinary imaging mode at high resolution which does not use the light field photography technique and an imaging mode based upon the light field photography technique is possible. In the former cited imaging mode, a microlens is not necessary. In the latter cited imaging mode, it is necessary to dispose a microlens on the optical axis.

The light field camera can be regarded as a camera in which the diaphragm mechanism in an ordinary camera is extended, and it is optically implemented by a multiview camera. In the light field camera, a plurality of images which are different in focal point are imaged simultaneously at various angles of view. An image which is in focus over the whole area can be generated by analyzing such image data. In addition, distance measurement utilizing the depth of field and estimation of the light source direction using an image data analysis can also be conducted, and information which cannot be obtained in the conventional cameras can also be acquired.

As a configuration in which multiple parallax images can be obtained and the resolution falling is suppressed, a multiview imaging apparatus having an image formation lens is proposed. This imaging apparatus includes an imaging lens, a macro lens array unit on which light transmitted by the imaging lens is incident, and an imaging device which receives light illuminated from the microlens array unit. Microlenses included in the microlens array unit are varifocal lenses in which the focal length becomes variable depending upon applied voltage.

As an example of the varifocal lens, a liquid crystal lens can be mentioned. In the liquid crystal lens, the apparent refractive index of the liquid crystal is changed by enclosing liquid crystal in a lens-shaped space and adjusting the applied voltage. Even if the lens has the same shape, the focal length of the lens is changed by changing the refractive index of a material which forms the lens.

If a liquid crystal lens is used as the varifocal lens, however, it becomes necessary to select special materials which implement a desired refractive index and a lens configuration which seals these materials becomes complicated, resulting in an increased manufacturing cost. Furthermore, the liquid crystal lens is susceptible to the influence of the environmental temperature and there is a fear that the focal length will change according to the ambient environmental temperature. In addition, it is difficult to conduct changeover for changing the focal length at high speed.

DETAILED DESCRIPTION

An optical device according to an embodiment includes: a lens array including a plurality of convex shaped lenses provided on a first surface thereof and taking a flat shape at a second surface which is opposite from the first surface; a lens holder comprising concave portions formed to correspond to respective lenses in the lens array, at a surface opposed to the lens array, each of the concave portions having a size which makes it possible for one of the convex shaped lenses corresponding to the concave portion to fit therein; and a drive unit configured to drive at least one of the lens array and the lens holder to bring the convex shaped lenses in the lens array and the concave portions in the lens holder into an isolation state or a contact state.

Hereafter, embodiments will be described with reference to the drawings. Incidentally, in the drawings, the same or similar components are denoted by the same or similar reference numerals. However, it should be noted that the drawings are schematic and the relation between thickness and plane dimensions and ratios among layers in thickness are different from those in reality. Therefore, concrete thicknesses and dimensions should be judged in consideration of the ensuing description. Furthermore, it is a matter of course that components which are different in mutual dimension relations and ratios between drawings are included.

(First Embodiment)

Figure 1:
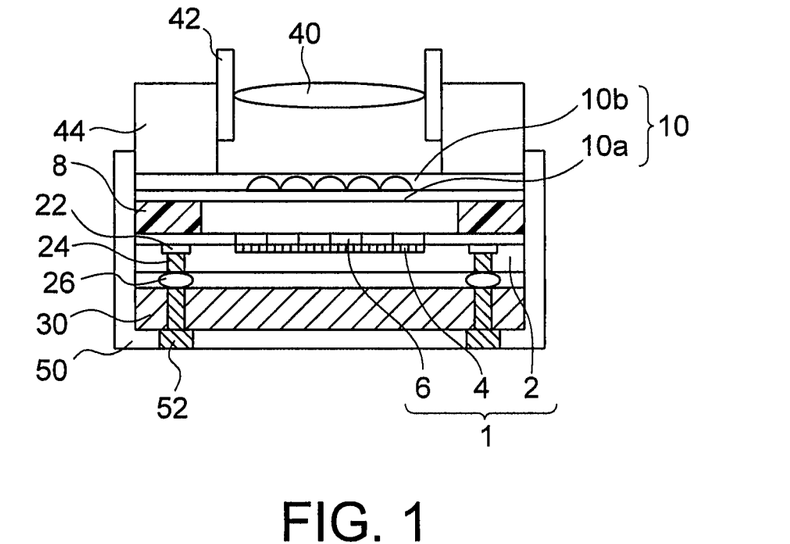
FIG. 1 is a sectional view showing a solid-state image apparatus according to a first embodiment.

A solid-state image apparatus according to a first embodiment will now be described with reference to FIGS. 1 to 6. FIG. 1 shows a cross-sectional view of the solid-state image apparatus according to the first embodiment. The solid-state image apparatus includes an imaging element 1. The imaging element 1 includes a semiconductor substrate 2, a plurality of pixels 4 having photodiodes formed on the semiconductor substrate 2, a color filter 6 formed over the pixels 4, and a drive/readout circuit (not illustrated) formed in the semiconductor substrate 2 to drive the plurality of pixels 4 and read out signals from these pixels 4. Incidentally, the plurality of pixels 4 are divided into a plurality of pixel blocks (not illustrated). Furthermore, an optical element 10 which is variable in focal length and which transmits visible light is provided over the semiconductor substrate 2 having pixels 4 and the color filter 6 formed thereon. A configuration and an action of the optical element 10 will be described in detail later. The optical element 10 is joined to the semiconductor substrate 2 by a spacer 8 made of a resin material and provided around an imaging area having pixels formed therein. Incidentally, position alignment at the time when joining the optical element 10 to the semiconductor substrate 2 is conducted on the basis of alignment marks which are not illustrated.

Furthermore, a readout electrode pad 22 for the pixels 4 is provided in the semiconductor substrate 2, a through electrode 24 passing through the semiconductor substrate 2 is formed under the electrode pad 22. And the semiconductor substrate 2 is electrically connected to a chip 30 via the through electrode 24 and a bump 26. A drive processing circuit which drives the imaging apparatus and processes a signal which has been read out is formed in the chip 30.

Furthermore, an image formation lens 40 is formed over the optical element 10. The image formation lens 40 is attached to a lens barrel 42. The lens barrel 42 is attached to a lens holder 44. The lens holder 44 is joined to the top of a peripheral area in which a lens of the optical element 10 is not provided. When attaching the image formation lens 40, the focal length of the image formation lens 40 may be adjusted on the basis of the relation between the pressing pressure and an output image. Incidentally, a light shading cover 50 for intercepting unnecessary light is attached around the semiconductor substrate 2, the optical element 10, and the chip 30. And a module electrode 52 which electrically connects the chip 30 to the outside is provided in the light shading cover 50.

Figure 2:
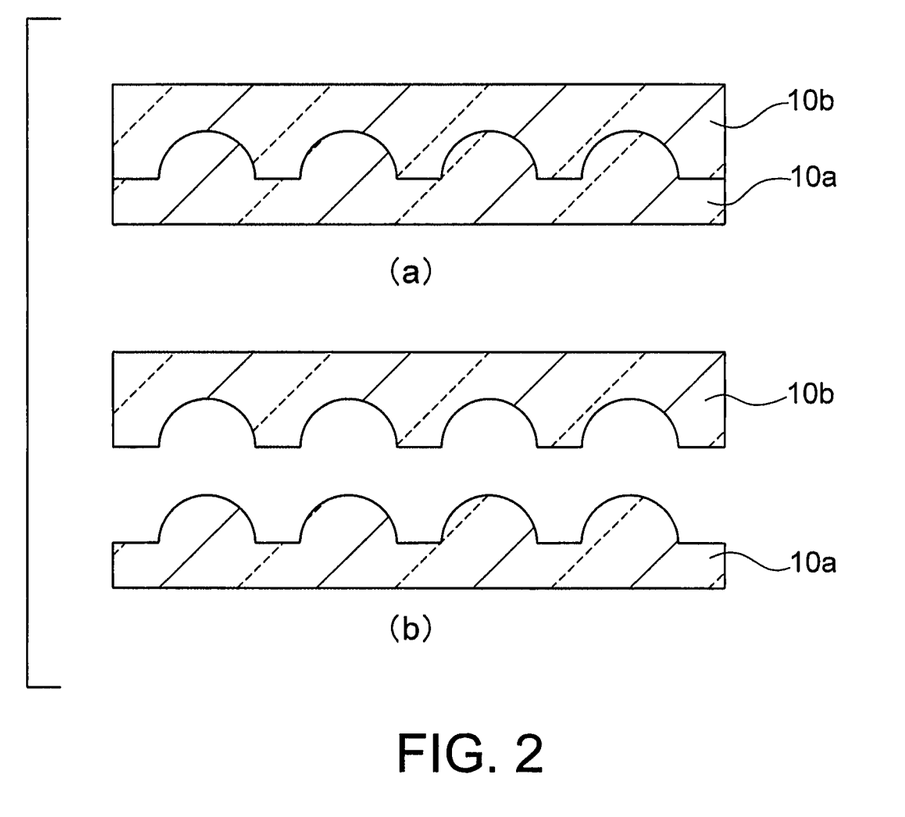
FIGS. 2(a) and 2(b) are sectional views for explaining an optical device in the solid-state image apparatus according to the first embodiment.
Figure 3:
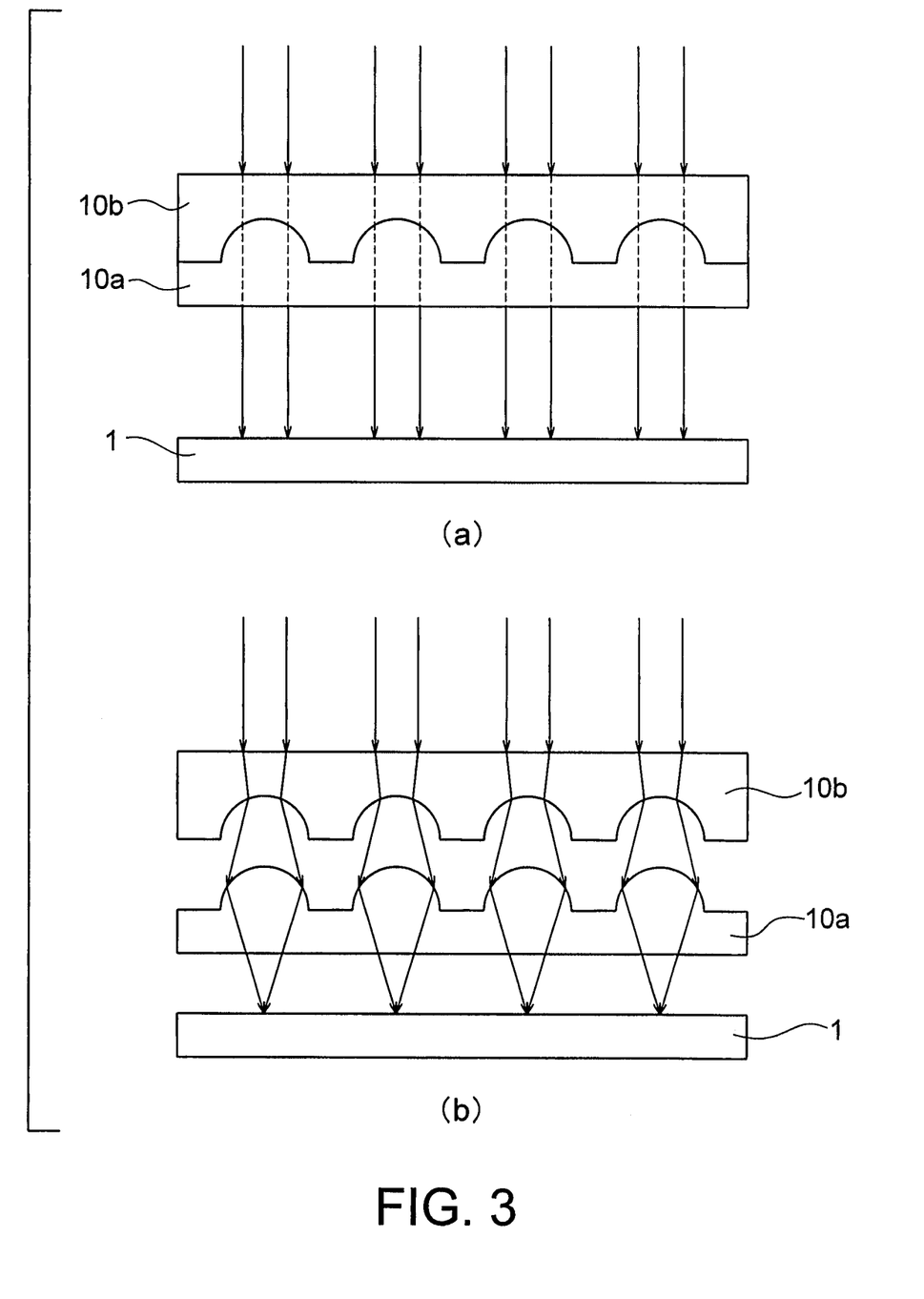
FIGS. 3(a) and 3(b) are diagrams for explaining the function of the optical device shown in FIGS. 2(a) and 2(b)

The optical element 10 will now be described with reference to FIGS. 2(a) to 3(b). The optical element 10 includes a lens array 10a and a lens holder 10b. The lens array 10a has a plurality of concave shaped lenses on a first face thereof and a flat shape on a second face thereof. Incidentally, each lens in the lens array 10a is provided to correspond to each pixel block. The first face of the lens array 10a having a plurality of lenses is disposed to be opposed to the lens holder 10b. On a face of the lens holder 10b opposed to the lens array 10a, concave portions having the same curvature as respective lenses of the lens array 10a are provided to correspond to respective lenses. When respective lenses of the lens array 10a are combined with respective concave portions of the lens holder 10b, the lens array 10a and the lens holder 10b become an optical element having an integral structure in the contact state as shown in FIG. 2(a). As shown in FIG. 2(b), however, it is also possible to form an isolation state with a predetermined distance in-between. Whether the lens array 10a and the lens holder 10b are brought into the contact state or the isolation state is determined by a drive mechanism which is not illustrated. Incidentally, the lens array 10a and the lens holder 10b have the same refractive index, and are made of, for example, the same material.

In the contact state, the lens array 10a and the lens holder 10b apparently constitute a transparent substrate having an integral structure because they have the same refractive index. As a result, a lens function is not generated, and light rays coming from over the optical element 10 arrive at the imaging element 1 located under the optical element 10 as ordinary parallel light rays, as shown in FIG. 3(a).

On the other hand, in the isolation state, light waves incident on the lens holder 10b are refracted to the outside by its concave portions and emitted. Then, the light waves are incident on respective lenses of the lens array 10a located under the lens holder 10b. Respective lenses have a convex shape, and light rays illuminated from the lens holder 10b are taken into the lenses. And an image is formed under the lens array 10a, i.e., in the pixel blocks of the imaging element 1 (FIG. 3(b)). In other words, the lens function is generated in the optical element 10.

In other words, the focal point changes depending on whether the lens holder 10b and the lens array 10a are in contact with each other or isolated from each other. It becomes possible to conduct changeover to bring about an ordinary shooting mode in the contact state and a light field shooting mode in the isolation state. According to the present scheme, the resolution is not reduced and it can be achieved to output an image with high resolution even at the time of the ordinary shooting mode.

A scheme for driving the optical element 10 will now be described.

(First Specific Example)

Figure 4:
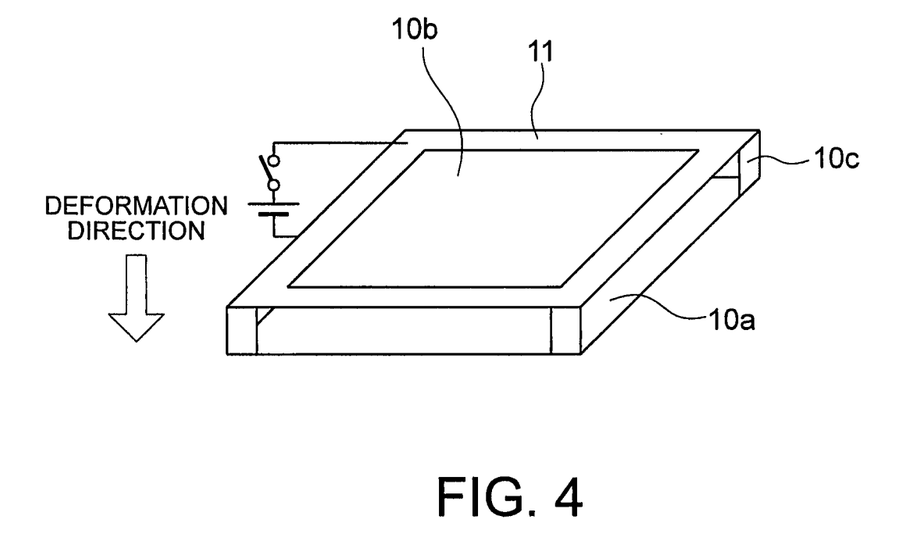
FIG. 4 is a diagram for explaining a first specific example of a drive scheme of the optical device shown in FIGS. 2(a) and 2(b)

FIG. 4 shows a first specific example of the scheme for driving the optical element 10. In the drive scheme in the first specific example, the lens array 10a having convex shaped lenses formed of a transparent material and the lens holder 10b having concave portions formed of a transparent material are disposed to be opposed to each other. And a piezoelectric drive unit 11 having a piezoelectric actuator is formed around the periphery of the lens holder 10b. The piezoelectric drive unit 11 and the lens holder 10b are united in one body. And the piezoelectric drive unit 11 or the lens holder 10b and the lens array 10a are connected by connection units 10c at four corners. For the piezoelectric actuator, ZnO, PZT (Pb(Zr$_x$Ti$_{1-x}$)O$_3$)), LiNbO$_3$, AlN, or the like can be used. For the lens holder 10b having concave portions, an insulative and optically transparent material, such as SiO$_2$, is used. An organic resin may also be used. Electrodes which can be supplied with an external voltage are provided on top and bottom faces of the piezoelectric actuator disposed around the periphery of the lens holder 10b. The piezoelectric actuator is displaced downward due to the piezoelectric effect by applying a voltage between the electrodes. The lens holder 10b displaced downward forms the contact state or the isolation state (non-contact state) with the lens array 10a having convex shaped lenses, and consequently the focal point can be made variable. As described earlier, it is necessary for the transparent material of a light transmission unit in the lens holder 10b to coincide in refractive index with the material forming the lens array 10a.

(Second Specific Example)

Figure 5:
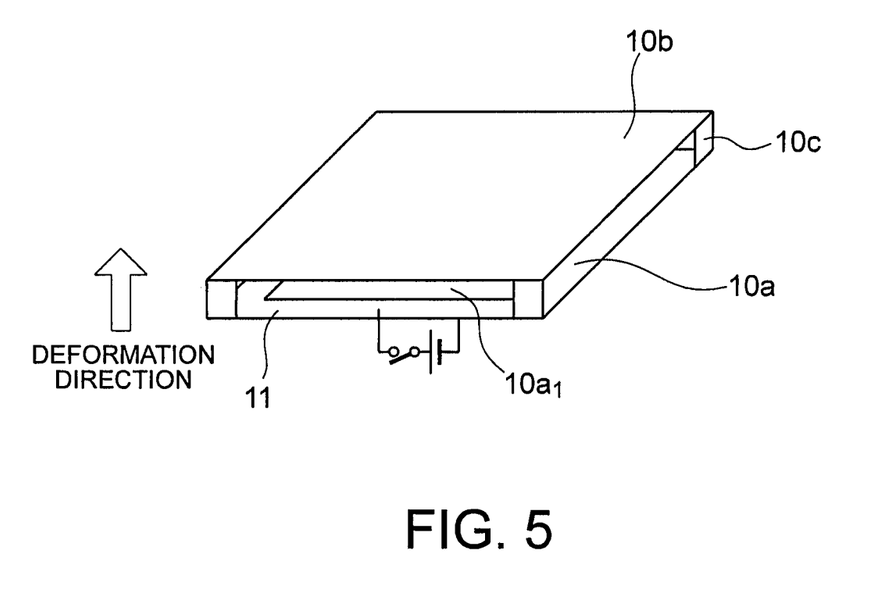
FIG. 5 is a diagram for explaining a second specific example of a drive scheme of the optical device shown in FIGS. 2(a) and 2(b)

FIG. 5 shows a second specific example of the scheme for driving the optical element 10. In the drive scheme in the second specific example, the lens array 10a having convex shaped lenses formed of a transparent material and the lens holder 10b having concave portions formed of a transparent material are disposed to be opposed to each other. And a piezoelectric drive unit 11 having a piezoelectric actuator is formed around the periphery of the lens holder 10b. The piezoelectric drive unit 11 and the lens holder 10b are united in one body. And the piezoelectric drive unit 11 or the lens array 10a and the lens holder 10b are connected by connection units 10c at four corners. Similar to the case described in the first specific example, for the piezoelectric actuator, ZnO, PZT, LiNbO$_3$, AlN, or the like can be used. For the lens holder 10b, an insulative and optically transparent material, such as SiO$_2$, is used. An organic resin may also be used. In the second specific example, electrodes which can be supplied with an external voltage are provided on top and bottom faces of the piezoelectric actuator disposed around the periphery of the lens array 10a. The piezoelectric actuator is displaced upward due to the piezoelectric effect by applying a voltage between the electrodes. The lens array 10a displaced upward forms the contact state or the isolation state (non-contact state) with the lens holder 10b, and consequently the focal point can be made variable. As described earlier, it is necessary for the transparent material of a light transmission unit in the lens holder 10b to coincide in refractive index with the material forming the lens array 10a.

(Third Specific Example)

Figure 6:
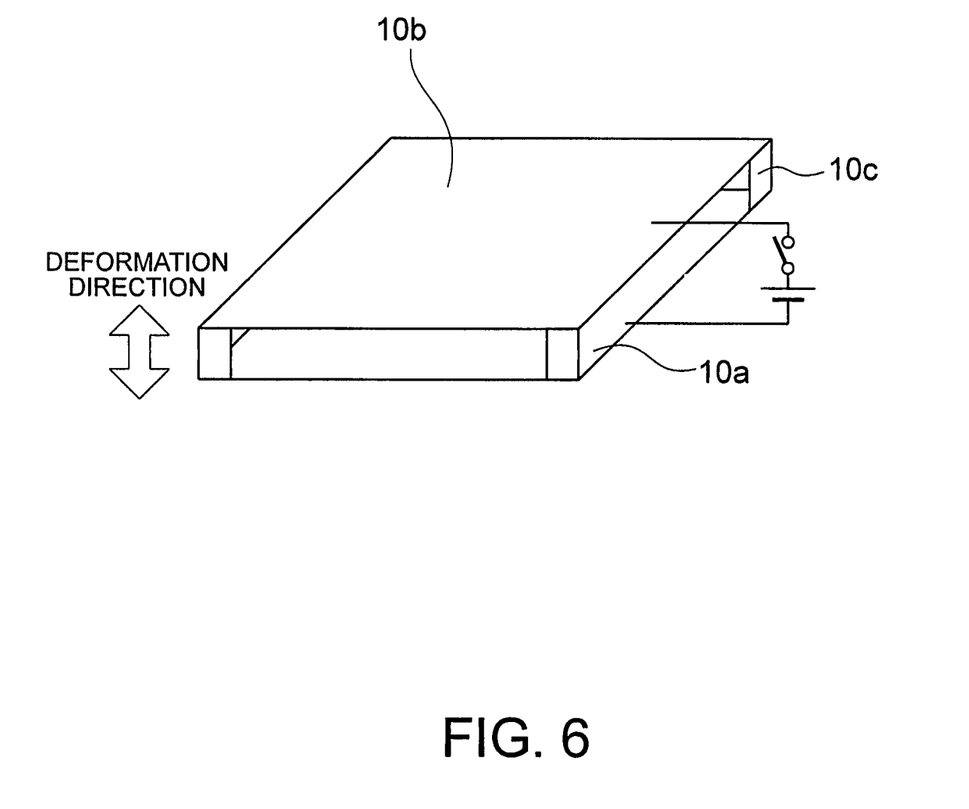
FIG. 6 is a diagram for explaining a third specific example of a drive scheme of the optical device shown in FIGS. 2(a) and 2(b)

FIG. 6 shows a third specific example of the scheme for driving the optical element 10.

In the first and second specific examples, either the lens holder 10b or the lens array 10a is piezoelectrically driven into the contact state or the non-contact state. As a matter of course, however, both the lens holder 10b and the lens array 10a may be driven. Such case will now be described as the third specific example. In the drive scheme of the third specific example, electrodes are provided in opposed positions of the both the lens holder 10b and the lens array 10a to constitute a parallel plate capacitor. And the contact state or the non-contact state of the lens holder 10b and the lens array 10a are achieved by electrostatic drive in which a voltage is applied between the electrodes.

(Second Embodiment)

Figure 7:
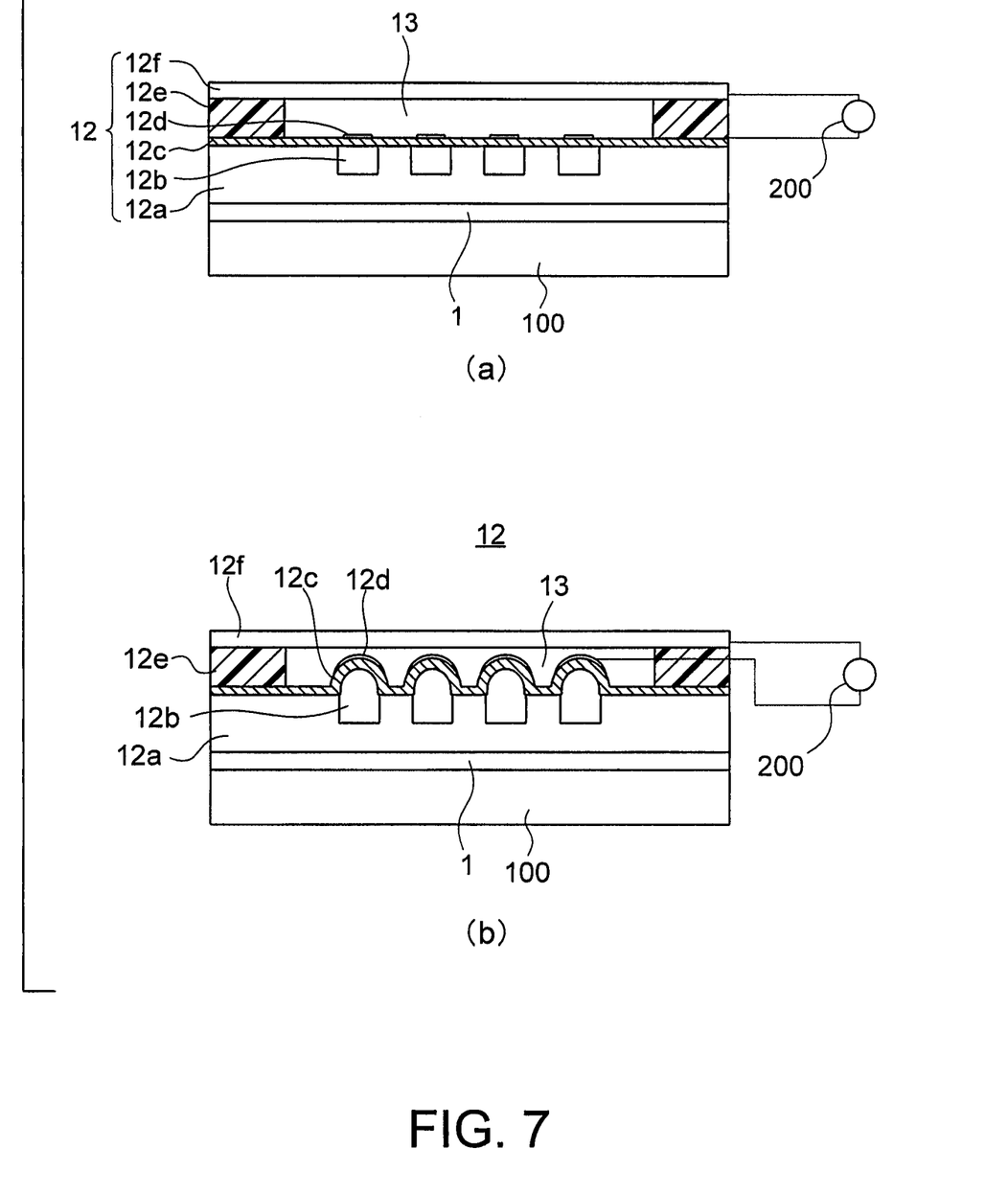
FIGS. 7(a) and 7(b) are sectional views showing a solid-state image apparatus according to a second embodiment.

A solid-state image apparatus according to a second embodiment will now be described with reference to FIGS. 7(a) and 7(b). FIGS. 7(a) and 7(b) are sectional views for explaining operation of the solid-state image apparatus according to the second embodiment. The solid-state image apparatus according to the second embodiment has a configuration obtained from that of the solid-state image apparatus according to the second embodiment by replacing the optical element 10 with an optical element 12. The optical element 12 is driven electrostatically by a drive circuit 200 and deformed to have a lens shape. Incidentally, an imaging element 1 is formed on a support substrate 100.

The optical element 12 is provided on the imaging element 1. The optical element 12 includes a transparent substrate 12a having a plurality of vacancies 12b arranged two-dimensionally on its surface which is opposite from the imaging element 1, a plastic transparent film 12c provided on the transparent substrate 12a, a plurality of transparent electrodes 12d provided on areas of the transparent film 12c corresponding to the plurality of vacancies 12b to adhere to the transparent film 12c, a spacer layer 12e provided around the transparent film 12c, and a transparent opposed electrode 12f provided on the spacer layer 12e to be opposed to the plurality of transparent electrodes 12d. Therefore, a cavity (air gap) 13 is formed between the plurality of transparent electrodes 12d and the opposed electrode 12f.

As a material of the plastic transparent film 12c, a transparent resin film made of polyimide, SU-8, PEN (polyethylene naphthalate) resin, PMMA (polymethyl methacrylate) resin, or the like can be used. As the transparent electrodes 12d and the transparent opposed electrode 12f, ZnO, ITO or the like can be used. The transparent electrodes 12d have a thickness which allows deformation according to deformation of the plastic transparent film 12c described later. Furthermore, the opposed electrode 12f may be provided to be stuck to a transparent substrate in order to enhance the rigidity. In that case, the film thickness of the opposed electrode 12f may be smaller.

The optical element 12 is driven by applying a voltage between the plurality of transparent electrodes 12d and the opposed electrode 12f by the drive circuit 200. Unless a voltage is applied between the plurality of transparent electrodes 12d and the opposed electrode 12f, the plastic transparent film 12c takes a flat shape (see FIG. 7(a)). If a voltage is applied between the plurality of transparent electrodes 12d and the opposed electrode 12f by the drive circuit 200, an electrostatic field is generated in the air gap 13. Since there are the vacancies 12b under the plastic transparent film 12c and the peripheries of the vacancies 12b are fixed, the plastic transparent film 12c and the transparent electrodes 12d are attracted to the side of the opposed electrode 12f by electrostatic force which is caused by applying the voltage, resulting in lens shapes (see FIG. 7(b)). In other words, when the voltage is not applied, the plastic transparent film 12c keeps the flat state and acts as a mere light transmitting member. On the other hand, when the voltage is applied, the plastic transparent film 12c is deformed in parts corresponding to respective transparent electrodes 12d, and it becomes possible to maintain a plurality of lens shapes having an arbitrary curvature and to function as a lens. As a result, the optical element 12 can be varied in focal point. Incidentally, when parts of the plastic transparent film 12c corresponding to the transparent electrodes 12d (parts corresponding to the vacancies 12b) are deformed to take lens shapes, respective transparent electrodes 12d are also deformed along the deformed plastic transparent film 12c (see FIG. 7(b)). Each transparent electrode 12d and a part of the plastic transparent film 12c corresponding to the transparent electrode 12d constitute a lens element. In each lens element, the transparent electrode 12d and a part of the plastic transparent film 12c corresponding to the transparent electrode 12d take a flat shape when the voltage is not applied by the drive circuit 200. The transparent electrode 12d and the part of the plastic transparent film 12c corresponding to the transparent electrode 12d take the lens shape when the voltage is applied by the drive circuit 200.

(First Specific Example)

Figure 8:
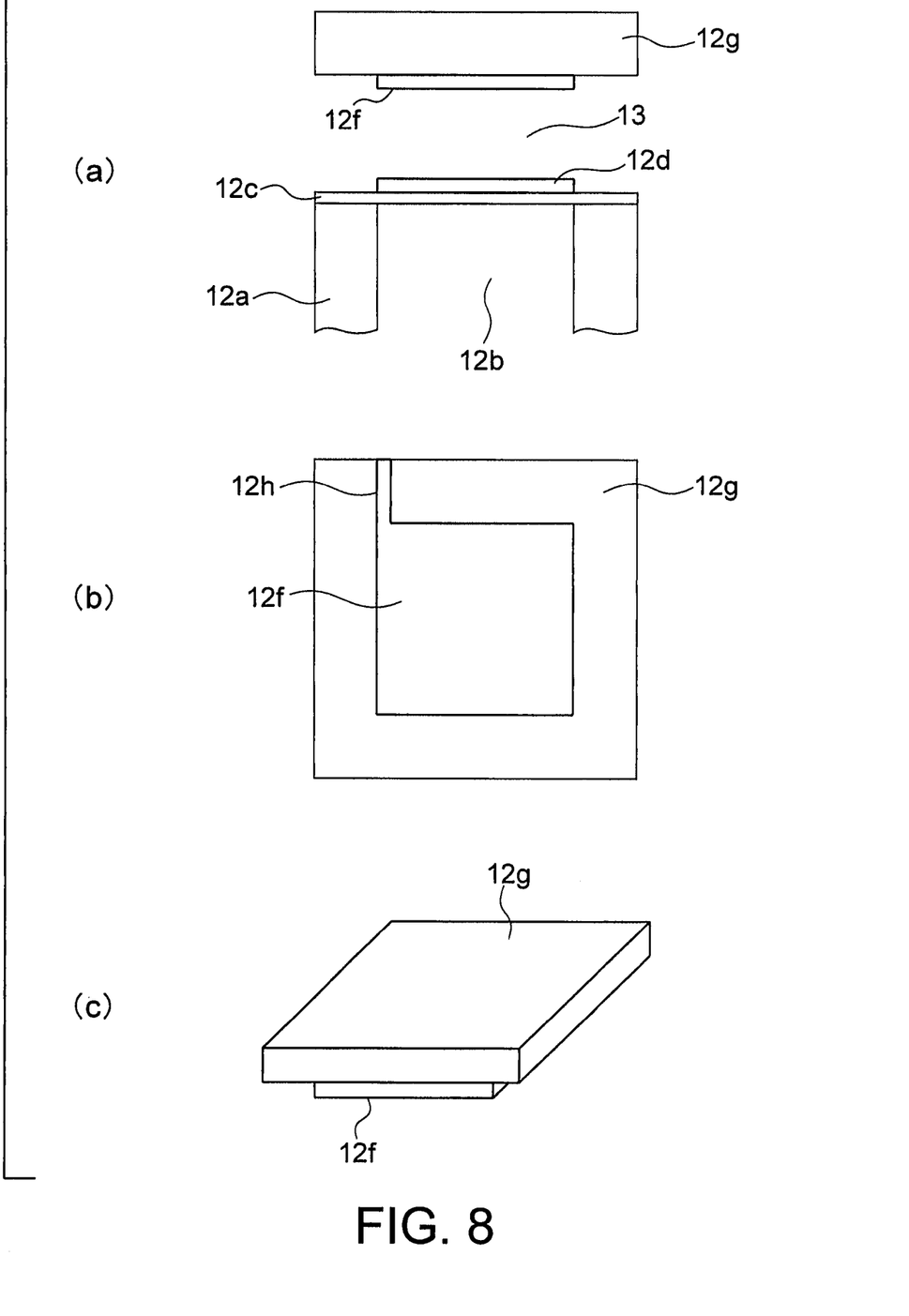
FIGS. 8(a) to 8(c) are diagrams showing a first specific example of a lens element in an optical device according to a second embodiment.

A configuration of a first specific example of one lens element in the optical element 12 will now be described with reference to FIGS. 8(a), 8(b) and 8(c). FIG. 8(a) shows a sectional view of the first specific example of the lens element. The lens element in the first specific example includes a plastic transparent film 12c provided on a transparent substrate 12a having a vacancy 12b at the surface, a transparent electrode 12d provided on the transparent film 12c to adhere thereto, an opposed electrode 12f provided to be opposed to the transparent electrode 12d with a gap 13 in-between, and a transparent substrate 12g on which the opposed electrode 12f is formed. FIG. 8(b) is a plan view showing the opposed electrode 12f and the transparent substrate 12g viewed from the side of the transparent electrode 12d. In FIGS. 7(a) and 7(b), the opposed electrode 12f is one common electrode with respect to a plurality of lens elements. In this first specific example, however, the opposed electrode 12f is provided individually for each lens element as appreciated from FIG. 8(b). Each opposed electrode 12f takes a rectangular shape, and an interconnection 12h for applying a voltage to each opposed electrode 12f. FIG. 8(c) is a perspective view of the transparent substrate 12g having the opposed electrode 12f provided thereon. In the first specific example, the transparent electrodes 12d provided on the plastic transparent film 12c may be formed as one transparent electrode which is common to a plurality of lens elements.

Furthermore, a configuration in which the opposed electrode is formed as one electrode which is common to a plurality of lens elements and the transparent electrode 12d provided on the plastic transparent film 12c takes the shape shown in FIG. 8(b) may be used. In this case, position alignment between the transparent electrode 12d and the opposed electrode 12f can be conducted with higher precision as compared with the first specific example.

(Second Specific Example)

Figure 9:
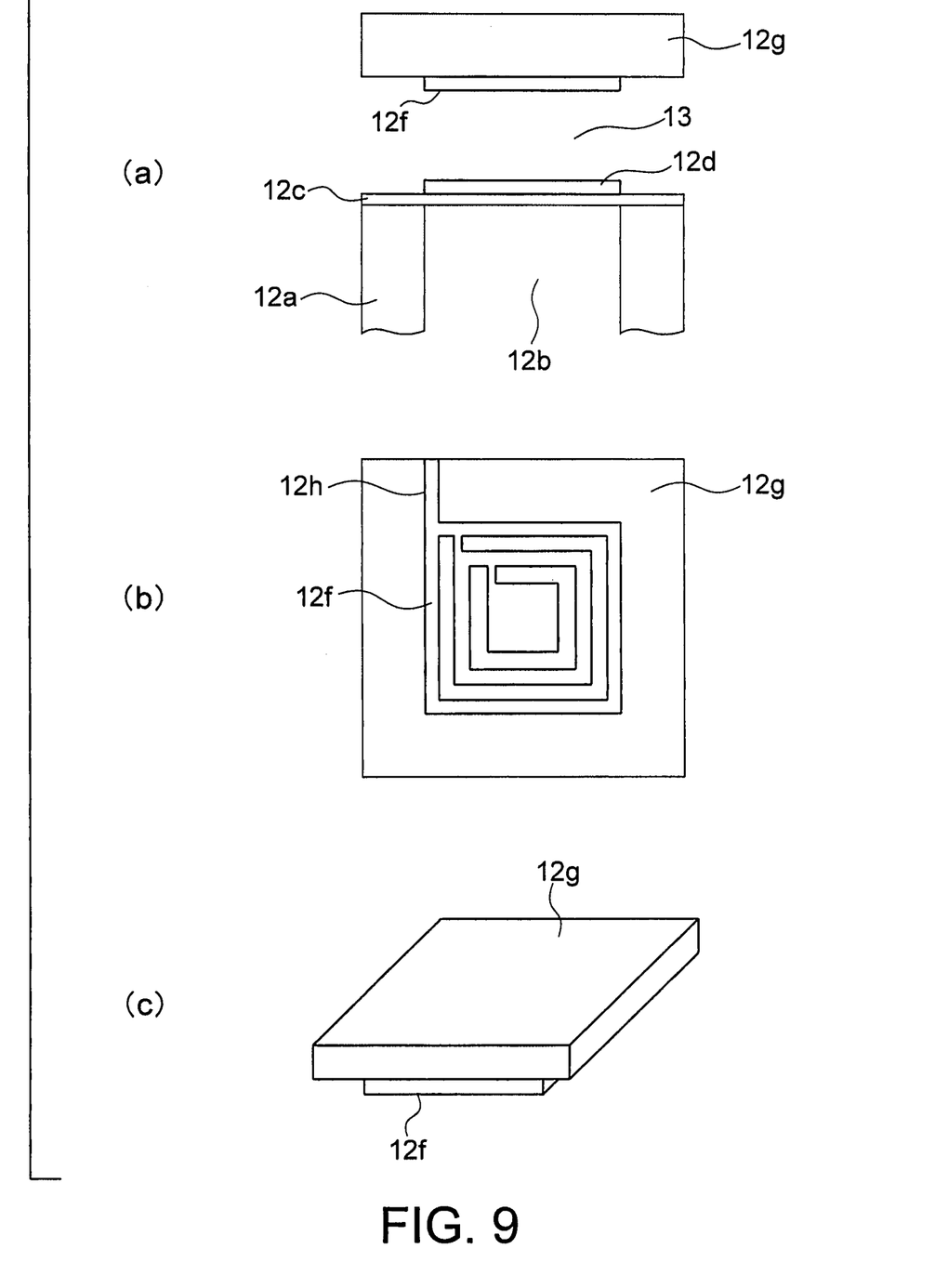
FIGS. 9(a) to 9(c) are diagrams showing a second specific example of a lens element in an optical device according to a second embodiment.

A configuration of a second specific example of one lens element in the optical element 12 will now be described with reference to FIGS. 9(a), 9(b) and 9(c). FIG. 9(a) shows a sectional view of the second specific example of the lens element. The lens element in the second specific example has a configuration obtained from that in the first specific example shown in FIGS. 8(a) to 8(c) by providing the plane shape of the transparent electrode 12f with volutes having an arbitrary interval shown in FIG. 9(b). FIG. 9(b) is a plan view showing the opposed electrode 12f and the transparent substrate 12g viewed from the side of the transparent electrode 12d. FIG. 9(c) is a perspective view of the transparent substrate 12g having the opposed electrode 12f provided thereon. In the second specific example, the transparent electrodes 12d provided on the plastic transparent film 12c may be formed as one transparent electrode which is common to a plurality of lens elements.

Furthermore, a configuration in which the opposed electrode is formed as one electrode which is common to a plurality of lens elements and the transparent electrode 12d provided on the plastic transparent film 12c takes the shape shown in FIG. 9(b) may be used. In this case, position alignment between the transparent electrode 12d and the opposed electrode 12f can be conducted with higher precision as compared with the second specific example.

(Third Specific Example)

Figure 10:
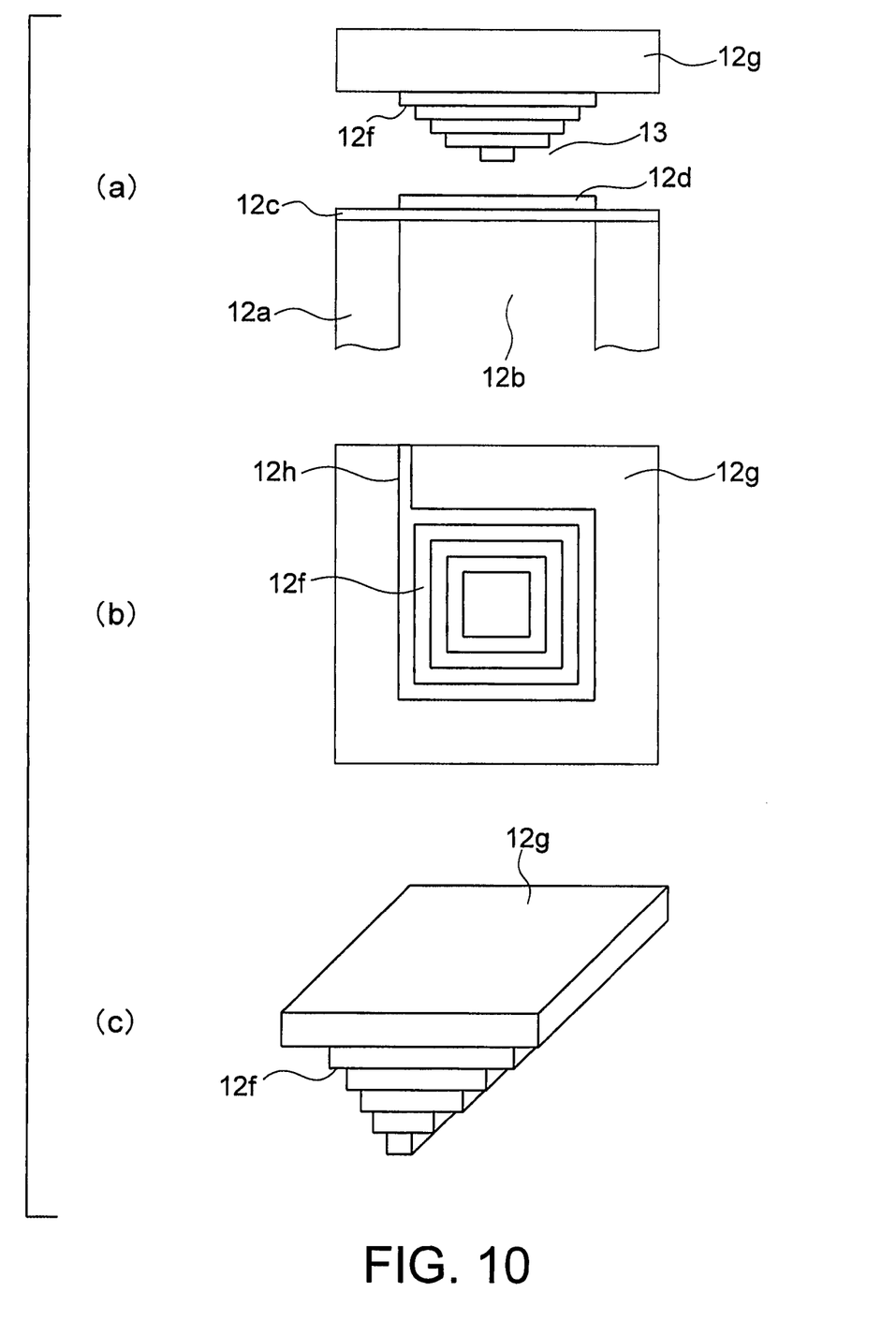
FIGS. 10(a) to 10(c) are diagrams showing a third specific example of a lens element in an optical device according to a second embodiment.

A configuration of a third specific example of one lens element in the optical element 12 will now be described with reference to FIGS. 10(a), 10(b) and 10(c). FIG. 10(a) shows a sectional view of the third specific example of the lens element. The lens element in the third specific example has a configuration obtained from that in the first specific example shown in FIGS. 8(a) to 8(c) by providing transparent electrode 12f with a shape having steps in the thickness direction such as a pyramid shown in FIG. 10(b). FIG. 10(b) is a plan view showing the opposed electrode 12f and the transparent substrate 12g viewed from the side of the transparent electrode 12d. FIG. 10(c) is a perspective view of the transparent substrate 12g having the opposed electrode 12f provided thereon. In the third specific example, the transparent electrodes 12d provided on the plastic transparent film 12c may be formed as one transparent electrode which is common to a plurality of lens elements.

Furthermore, a configuration in which the opposed electrode is formed as one electrode which is common to a plurality of lens elements and the transparent electrode 12d provided on the plastic transparent film 12c takes the shape shown in FIG. 10(b) may be used. In this case, position alignment between the transparent electrode 12d and the opposed electrode 12f can be conducted with higher precision as compared with the second specific example.

If the transparent electrode of each lens element takes the simple rectangular shape shown in FIG. 8(b) as in the first specific example, the electrode area of the transparent electrode can be made larger and consequently the electrostatic force, i.e., the displacement quantity, can be made larger. On the other hand, if the transparent electrode of each lens element takes the shape shown in FIG. 9(b) or FIG. 10(b) as in the second or third specific example, it becomes possible to bring about distribution of electrostatic energy. As a result, deformation to a lens shape having an arbitrary curvature becomes possible. In the first to third specific examples, the transparent electrode takes the rectangular shape as shown in FIGS. 8(b), 9(b) and 10(b). However, the transparent electrode may take a circular shape.

Figure 12:
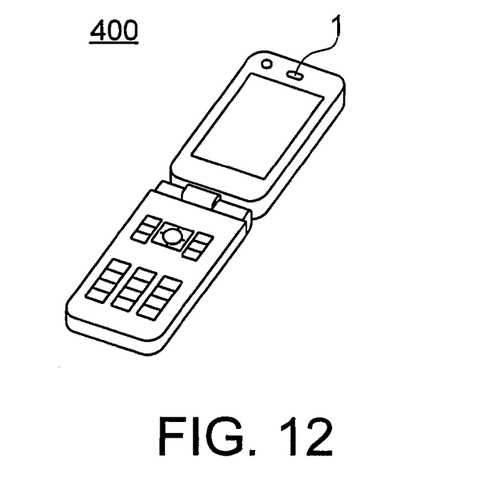
FIG. 12 is a diagram showing an example of a portable information terminal using a solid-state image apparatus according to the first or second embodiment.

Incidentally, the solid-state image apparatuses in the first and second embodiments can be applied not only to a still camera, but also to a portable information terminal, for example, a portable information terminal 400 shown in FIG. 12. The portable information terminal shown in FIG. 12 is an example, and reference numeral 1 denotes an imaging element in the solid-state image apparatus in the first or second embodiment.

(Third Embodiment)

Figure 11:
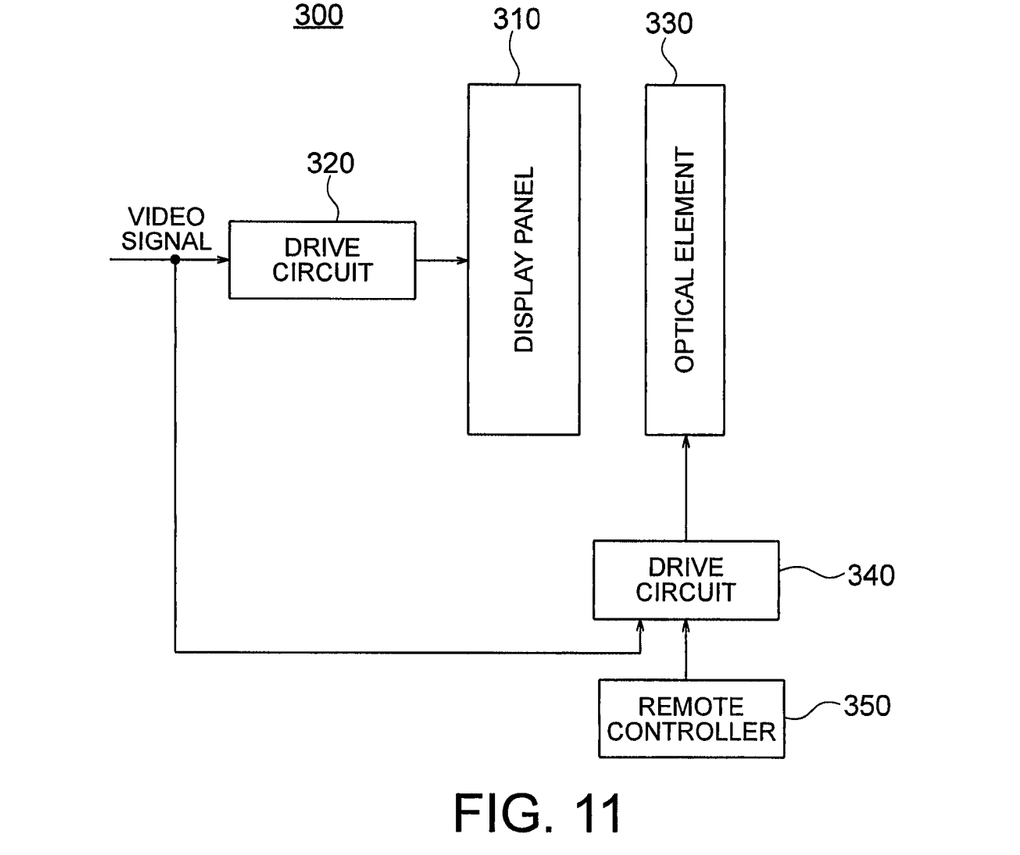
FIG. 11 is a block diagram showing a display apparatus according to a third embodiment.

A display apparatus according to a third embodiment will now be described with reference to FIG. 11. FIG. 11 is a block diagram showing the display apparatus according to the third embodiment. A display apparatus 300 according to the third embodiment is a display apparatus capable of changing over between two-dimensional display and three-dimensional display and of conducting display. The display apparatus 300 includes a display panel 310, a drive circuit 320, and an optical element 330 which is variable in focal point. The display panel 310 has a display screen having pixels arranged in a matrix form. The display panel 310 may be a liquid crystal display panel, a plasma display panel, a field emission display panel, or an organic EL display panel of direct view type or projection type, as long as pixels respectively having positions determined in the display screen are arranged in a matrix form in a plane.

The drive circuit 320 drives the display panel 310. Specifically, the drive circuit 320 sends a video signal (display data) sent from the outside to the display panel 310, assigns the display data to pixels on the display panel 310, and drives the display panel 310 to display a two-dimensional image or a three-dimensional image. Incidentally, the drive circuit 320 may be integrated with the display panel 310, or may be provided outside the display panel 310.

The optical element 330 is provided in front of the display panel 310, and the optical element 330 has a configuration which controls light rays illuminated from pixels on the display panel 310 and which is variable in focal point. The optical element 330 is, for example, the optical element 10 described in the first embodiment or the optical element 12 described in the second embodiment, and the function of making light rays advance straight and the lens function can be changed over and used. For example, when the display apparatus displays a two-dimensional image, the function of making light rays advance straight is used, whereas when the display apparatus displays a three-dimensional image, the lens function is used. The changeover between the function of making light rays advance straight and the lens function may be conducted automatically by a drive circuit 340 on the basis of a video signal which is input to the drive circuit 320. Or the changeover may be conducted by the drive circuit 340 on the basis of a command signal which is sent by a viewer to the drive circuit 340 by means of a remote controller 350. When the video signal sent from the outside is a two-dimensional video signal in this case, it is desirable that the display panel 310 or the drive circuit 320 in the display apparatus 300 has a function of estimating or detecting depth information from the two-dimensional video signal by using well-known techniques and generating a three-dimensional video signal by using the estimated or detected depth information. The estimation or detection of the depth information can be conducted, for example, by finding a motion vector and using the motion vector.

Furthermore, a plurality of pixels (a pixel block) is assigned to each of the lenses in the optical element 310 in the same way as the first and second embodiments. If the optical element 310 which allows the changeover between the function of making light rays advance straight and the lens function is used in a display apparatus capable of displaying a three-dimensional image, the display apparatus can display a two-dimensional image without lowering the resolution.

Incidentally, in the optical element used in the display apparatus according to the third embodiment, the lens may take a semicylindrical shape.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:

1. An optical element comprising:
a lens array comprising a plurality of convex shaped lenses provided on a first surface thereof and taking a flat shape at a second surface which is opposite from the first surface;
a lens holder comprising concave portions formed to correspond to respective lenses in the lens array, at a surface opposed to the lens array, each of the concave portions having a size which makes it possible for one of the convex shaped lenses corresponding to the concave portion to fit therein;
a drive unit configured to drive at least one of the lens array and the lens holder to bring the convex shaped lenses in the lens array and the concave portions in the lens holder into an isolation state or a contact state;
the isolation state with a predetermined distance in-between, or a contact state having an integral structure with the same refractive index.

2. The element according to claim 1, wherein the drive unit drives by means of piezoelectric drive or electrostatic drive.

3. An optical element comprising:
a first transparent substrate having a plurality of vacancies at a surface thereof;
a plastic transparent film provided on the first transparent substrate to cover the plurality of vacancies;
first transparent electrodes provided at least on areas of the transparent film corresponding to the plurality of vacancies to adhere to the transparent film;
a second transparent electrode provided at a distance from the first transparent electrodes to be opposed to the first transparent electrodes; and
a drive unit configured to drive to deform the transparent film by applying a voltage between the first transparent electrodes and the second transparent electrode.

4. The element according to claim 3, wherein the transparent film is deformed to have lens shapes when the voltage is applied between the first transparent electrodes and the second transparent electrode by the drive unit.

5. A solid-state image apparatus comprising:
an imaging lens to image a subject;
the optical element according to claim 1 on which light transmitted by the imaging lens is incident; and
an imaging element which receives light emitted from the optical element.

6. The apparatus according to claim 5, wherein
in a case of an ordinary shooting mode, the convex shaped lenses in the lens array and the concave portions in the lens holder are brought into a contact state, and
in a case of a shooting mode based upon a light field technique, the convex shaped lenses in the lens array and the concave portions in the lens holder are brought into an isolation state.

7. A solid-state image apparatus comprising:
an imaging lens to image a subject;
the optical element according to claim 3 on which light transmitted by the imaging lens is incident; and
an imaging element which receives light emitted from the optical element.

8. A portable information terminal comprising the solid-state image apparatus according to claim 5.

9. A portable information terminal comprising the solid-state image apparatus according to claim 7.

10. A display apparatus comprising:
a display panel comprising a display screen on which pixels are arranged in a matrix form;
a drive circuit configured to send display data to the display panel, assigns the display data to pixels on the display panel, and drive the display panel to display a two-dimensional image or a three-dimensional image; and
the optical element according to claim 1 provided in front of the display panel to control light rays emitted from the pixels on the display panel.

11. The apparatus according to claim 10, wherein
when displaying the two-dimensional image, the convex shaped lenses in the lens array and the concave portions in the lens holder are brought into a contact state, and
when displaying the three-dimensional image, the convex shaped lenses in the lens array and the concave portions in the lens holder are brought into an isolation state.

12. A display apparatus comprising:
a display panel comprising a display screen on which pixels are arranged in a matrix form;
a drive circuit configured to send display data to the display panel, assigns the display data to pixels on the display panel, and drive the display panel to display a two-dimensional image or a three-dimensional image; and
the optical element according to claim 3 provided in front of the display panel to control light rays emitted from the pixels on the display panel.

13. The apparatus according to claim 12, wherein
when displaying the two-dimensional image, a voltage is not applied between the first transparent electrodes and the second transparent electrode, and
when displaying the three-dimensional image, a voltage is applied between the first transparent electrodes and the second transparent electrode.

* * * * *